(12) United States Patent
Miller et al.

(10) Patent No.: US 7,066,714 B2
(45) Date of Patent: Jun. 27, 2006

(54) HIGH SPEED ROTOR ASSEMBLY SHROUD

(75) Inventors: Jeff H. Miller, Simi Valley, CA (US);
Xinhong J. Zheng, Valencia, CA (US);
Steven P. Grota, Thousand Oaks, CA (US); Khin C. Phui, Pomona, CA (US)

(73) Assignee: United Technologies Corporation, Hartford, CT (US)

( * ) Notice: Subject to any disclaimer, the term of this patent is extended or adjusted under 35 U.S.C. 154(b) by 130 days.

(21) Appl. No.: 10/811,359

(22) Filed: Mar. 26, 2004

(65) Prior Publication Data

US 2005/0214120 A1 Sep. 29, 2005

(51) Int. Cl.
*F04D 29/08* (2006.01)

(52) U.S. Cl. ................... 415/173.6; 416/192

(58) Field of Classification Search ............ 415/173.6, 415/173.1, 173.4, 173.3; 416/190, 191, 192, 416/194, 195
See application file for complete search history.

(56) References Cited

U.S. PATENT DOCUMENTS

| | | | |
|---|---|---|---|
| 5,154,581 A * | 10/1992 | Borufka et al. | ............ 416/190 |
| 6,086,328 A | 7/2000 | Lee | |
| 6,146,089 A | 11/2000 | Allen et al. | |
| 6,152,694 A | 11/2000 | Ai | |
| 6,164,916 A | 12/2000 | Frost et al. | |
| 6,171,058 B1 | 1/2001 | Stec | |
| 6,241,471 B1 | 6/2001 | Herron | |
| 6,340,284 B1 | 1/2002 | Beeck | |
| 6,371,727 B1 * | 4/2002 | Stangeland et al. | ......... 416/190 |
| 6,491,498 B1 | 12/2002 | Seleski et al. | |

* cited by examiner

*Primary Examiner*—Edward K. Look
*Assistant Examiner*—Dwayne J White
(74) *Attorney, Agent, or Firm*—Alston & Bird LLP

(57) ABSTRACT

An improved rotor assembly shroud includes at least one reinforcing flange on the upper surface of the shroud. The strength provided by the reinforcing flange allows for a smaller shroud thickness resulting in a net reduction of shroud mass. The lower shroud mass reduces the centrifugal stress on the rotor assembly blade during operation. The strength provided by the reinforcing flanges also significantly reduces the centrifugal bending stress on the shroud during operation. The shroud mass may be further reduced by tapering the shroud leading and trailing edges or, for shrouds incorporating a damper, by providing a damper cavity with a lower diameter surface defining an opening therethrough.

22 Claims, 5 Drawing Sheets

HIGH SPEED ROTOR ASSEMBLY SHROUD

FEDERALLY SPONSORED RESEARCH OR DEVELOPMENT

The invention described herein was made in the performance of work under NASA Contract No. NAS8-01107 and is subject to the provisions of Section 305 of the National Aeronautics and Space Act of 1958 (72 Stat. 435; 42 U.S.C. 2457).

BACKGROUND OF THE INVENTION

1. Field of the Invention

This invention relates to rotor blade shrouds and more specifically to reducing centrifugal stresses experienced by rotor blade components during operation.

2. Description of Related Art

Rotor assemblies are used in a variety of turbo-machines, such as turbines, compressors and the like. Regardless of the application, as shown in FIG. 1, typical rotor assembly 2 construction includes a disk 4 mounted on a rotating shaft 6 with a plurality of blades 8 extending radially outward around the circumference of the disk. The blades are normally mounted on the disk in a dovetail slot 9 designed to match the dovetail root portion 10 of the blade. Extending radially from the root portion, the blade also includes a platform portion 12, an airfoil portion 14 and a shroud 20, as shown in FIG. 2. The airfoil portion includes a generally concave high-pressure sidewall 22 and a generally convex low-pressure sidewall 24 that extend axially from the blade leading edge 26 to the blade trailing edge 28. The airfoil sidewalls extend radially between the platform portion of the rotor blade and the shroud.

Flow of the working fluid, i.e., air for jet engines, across the airfoil portion imparts a force upon the blades and results in rotation of the shaft, thereby converting the thermal and kinetic energy of the working fluid into mechanical rotation of the rotor. Rotor efficiency is improved by minimizing leakage of the working fluid through the gap between the blade and the stationary housing (not shown) surrounding the rotor. One commonly used design to prevent this leakage is the use of a shroud. The shroud is located at the radially distal end of the rotor blade adjacent the stationary housing and is designed to minimize the flow of working fluid through the gap between the rotor blade and the stationary housing. Shrouds are also designed to minimize the flow of working fluid in the space between circumferentially adjacent shrouds.

FIG. 3 is a top view showing conventional shrouds 20 including generally parallel leading 30 and trailing edges 32, oriented generally perpendicular to the working fluid flow path, and first 34 and second 36 circumferential sides. The shroud circumferential sides are generally contoured to complement the circumferentially adjacent shrouds, thereby preventing the flow of working fluid between adjacent shrouds. Conventional shrouds also typically include one or more narrow sealing rails or knife edges 38 that extend radially outward from the shroud in close proximity to the stationary housing and typically extend continuously across the top surface of the shroud between first and second circumferential sides. The sealing rail minimizes leakage of the working fluid through the gap between the rotor assembly and the stationary housing. Sealing rails further provide sacrificial material in the event of contact with the stationary housing, thereby preventing damage to the shroud.

Although the shroud improves rotor assembly efficiency, the additional mass of conventional shrouds introduces significant stresses during operation, particularly at the root portion of the blade. These stresses can result in high cycle fatigue and potential failure of the rotor assembly. As the component most remote from the axis of rotation, the shroud experiences the maximum angular velocity during operation. This velocity, combined with the additional mass of the conventional shroud, significantly increases the centrifugal force on the rotor blade during operation. The shroud itself experiences significant bending stresses during operation, particularly at the fillet 40, shown in FIG. 2, defined by the intersection of the shroud with the airfoil portion of the blade. Conventional shroud designs compensate for the higher bending stress at the fillet by increasing the thickness T of the shroud at the intersection with the airfoil portion of the blade, as shown in FIG. 2. Because the bending stress decreases farther from the fillet, conventional shroud thickness narrows as the shroud extends circumferentially away from the airfoil portion and is generally a minimum near the shroud circumferential sides. Conventional shroud thicknesses vary based upon design and operating conditions such as the material used to manufacture the blade, the operating temperature, the angular velocity and the distance the shroud overhangs the airfoil in the circumferential direction, but are typically about 0.22 inches at the fillet and 0.12 inches at the circumferential sides for shrouds made of A-286, an iron-based superalloy, and designed to operate at shroud speeds of approximately 1900 feet per second. The additional shroud thickness near the fillet reduces the centrifugal bending stress acting upon the shroud during operation but, due to the additional mass, increases the centrifugal stress on the blade.

Conventional shrouds may optionally provide frictional damping to reduce the magnitude of vibratory stresses induced on rotor assembly blades during operation by limiting the relative motion of adjacent components through frictional rubbing contact. Many techniques are known to achieve the necessary frictional rubbing contact such as direct shroud-to-shroud contact, for longer blades, or the use of frictional dampers, for shorter blades. Several frictional damper designs are known in the art such as blade-to-ground dampers and blade-to-blade dampers. Blade-to-blade dampers can be located anywhere between adjacent blades but are most effective when located radially distal from the axis of rotation because there is greater relative motion between adjacent blades. When located on the conventional shrouds, blade-to-blade dampers are held in place by several known means such as rivets. Frictional dampers are constructed of any suitable damping material, such as metal and may be a single piece or several pieces.

Prior art designs have attempted various methods to reduce centrifugal stresses on rotor blades. U.S. Pat. No. 6,491,498 to Seleski et al., incorporated herein by reference, discloses a turbine blade pocket shroud wherein pockets or voids in the shroud reduce the shroud mass, thereby reducing the magnitude of centrifugal stress on the rotor blade. But additional reductions are desired. U.S. Pat. No. 6,241,471 to Herron, also incorporated herein by reference, discloses a shroud with a reinforcing bar to help prevent high cycle fatigue failures. This design reduces the centrifugal bending stress on the shroud but the additional mass of the reinforcing bars actually increases the magnitude of the centrifugal stress on the blade. Therefore, further improvements to reduce rotor blade centrifugal stresses are required.

A need exists for a rotor blade shroud design with reduced mass to limit centrifugal stresses on the blade during rotor operation and with increased strength to withstand the centrifugal bending stress on the shroud resulting from rotor operation.

BRIEF SUMMARY OF THE INVENTION

The present invention addresses the above needs and achieves other advantages by providing a rotor assembly blade having a shroud with a lower mass than conventional shrouds, thereby reducing the centrifugal stress on the blade, and with improved strength, thereby reducing the centrifugal bending stress on the shroud.

In one embodiment, the present invention includes a shroud with a constant thickness. By maintaining a constant thickness, the shroud mass may be advantageously reduced relative to conventional shrouds, thereby reducing the centrifugal stress on the blade during operation. However, the reduction in shroud thickness increases the centrifugal bending stress on the shroud during operation. To provide sufficient strength to withstand the centrifugal bending stress on the shroud during operation, the shroud includes one or more reinforcing flanges on the upper surface of the lower portion of the shroud. The reinforcing flange or flanges may include a sealing rail extending radially outwardly therefrom to prevent the leakage of working fluid through the shroud-housing gap.

In another embodiment of the present invention, the shroud mass is advantageously reduced further by tapering the leading and trailing edges of the shroud in a circumferential direction such that a width of the lower portion between opposed first and second circumferential sides varies in the circumferential direction.

In yet another aspect of the present invention, the shroud mass is further advantageously reduced for shroud designs that incorporate blade-to-blade dampers by providing a shroud damper cavity in which the damper cavity inner diameter surface defines an opening therethrough having a narrow ledges to retain the damper against gravitational forces during non-rotation of the rotor assembly. This configuration effectively retains a blade-to-blade damper but eliminates the additional mass of a shroud damper cavity with an intact inner diameter surface.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Figure 1:
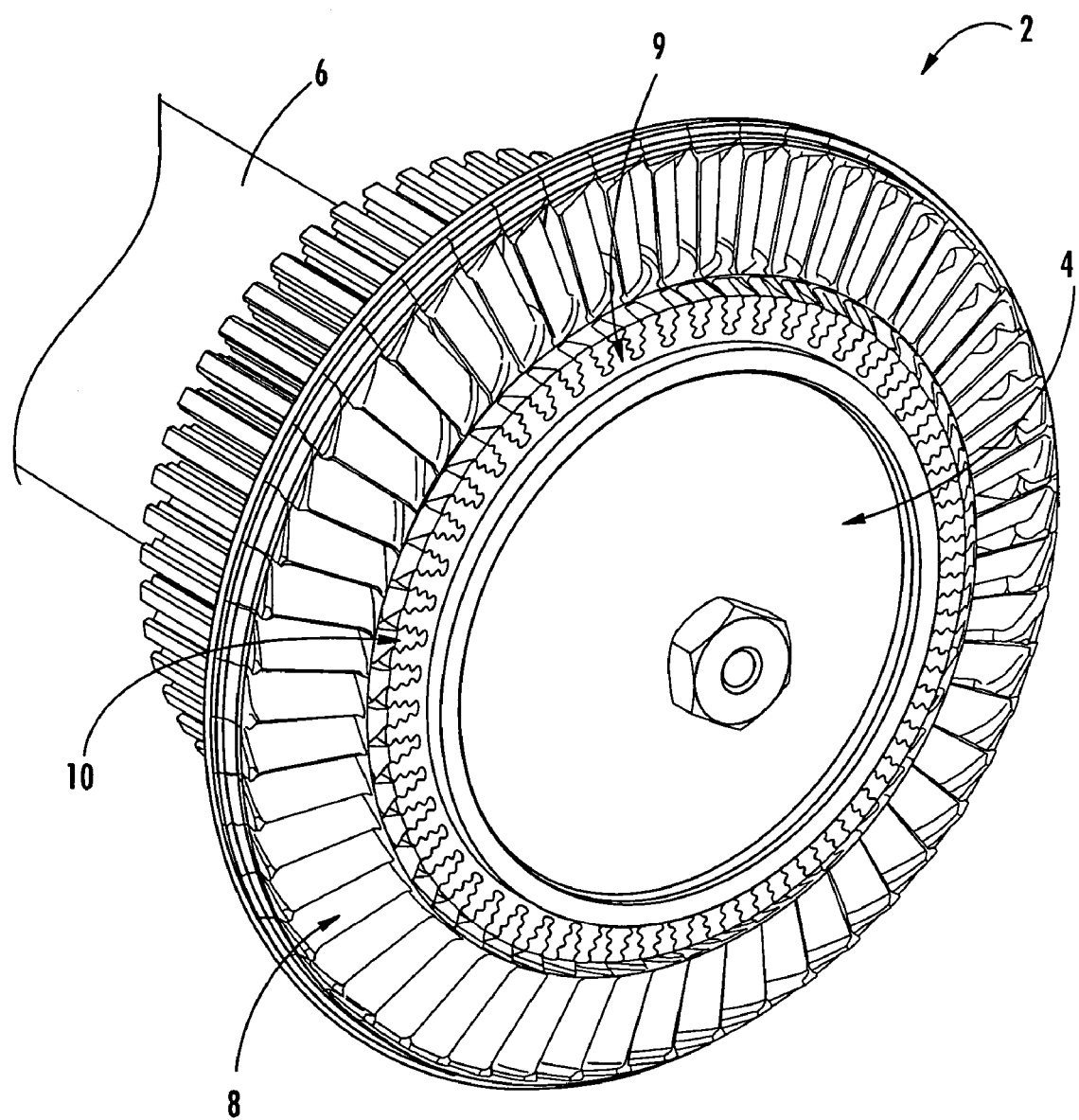
Figure 2:
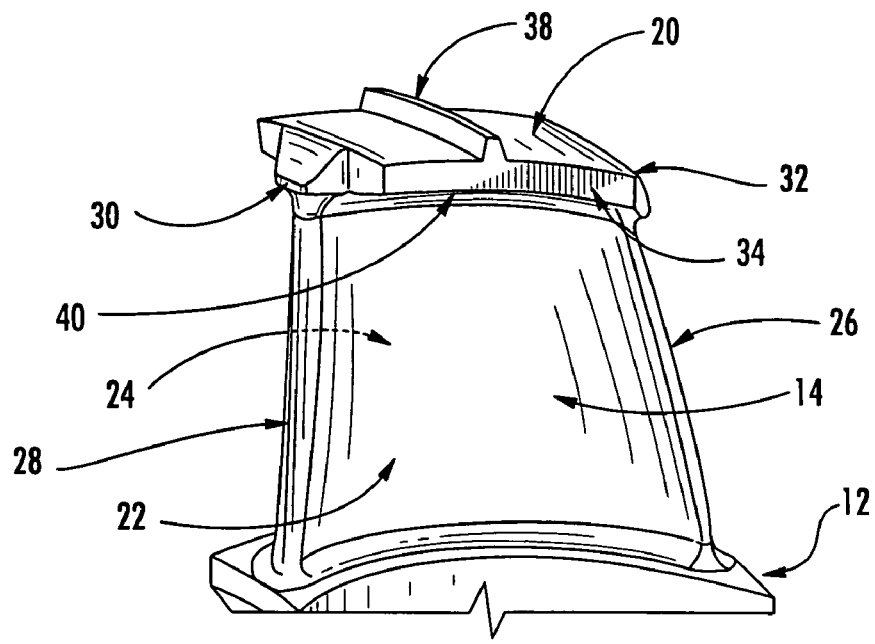
Figure 3:
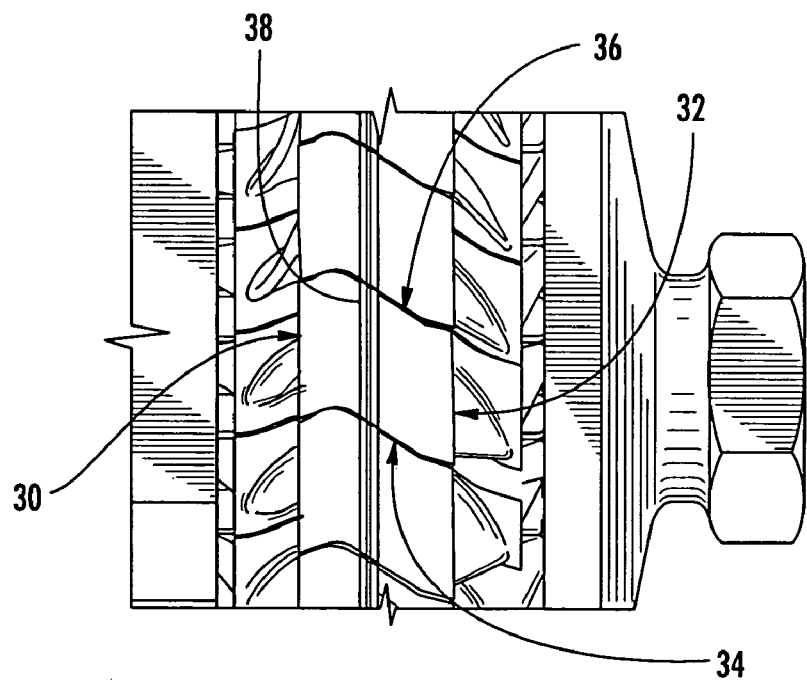
Figure 4:
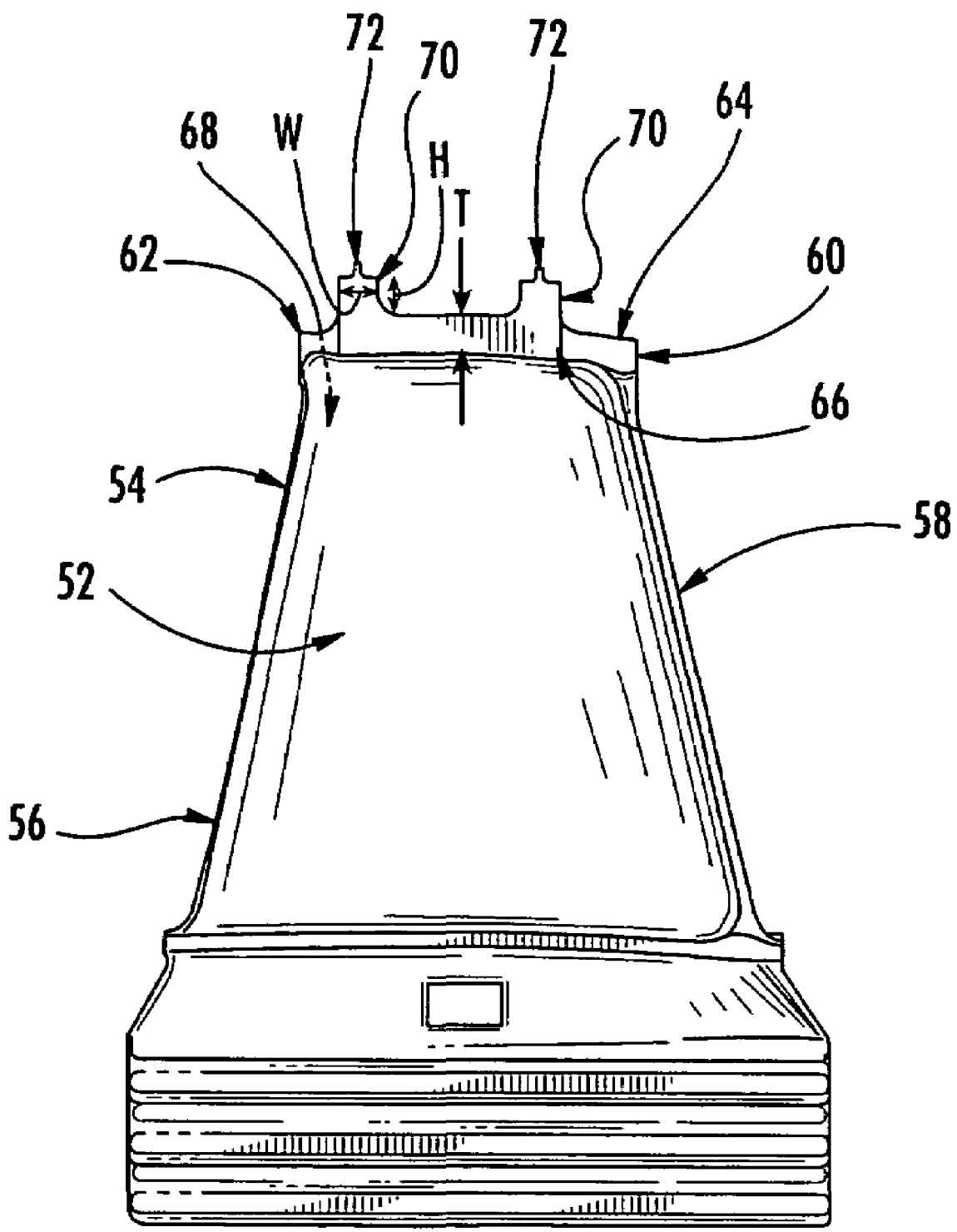
Figure 5:
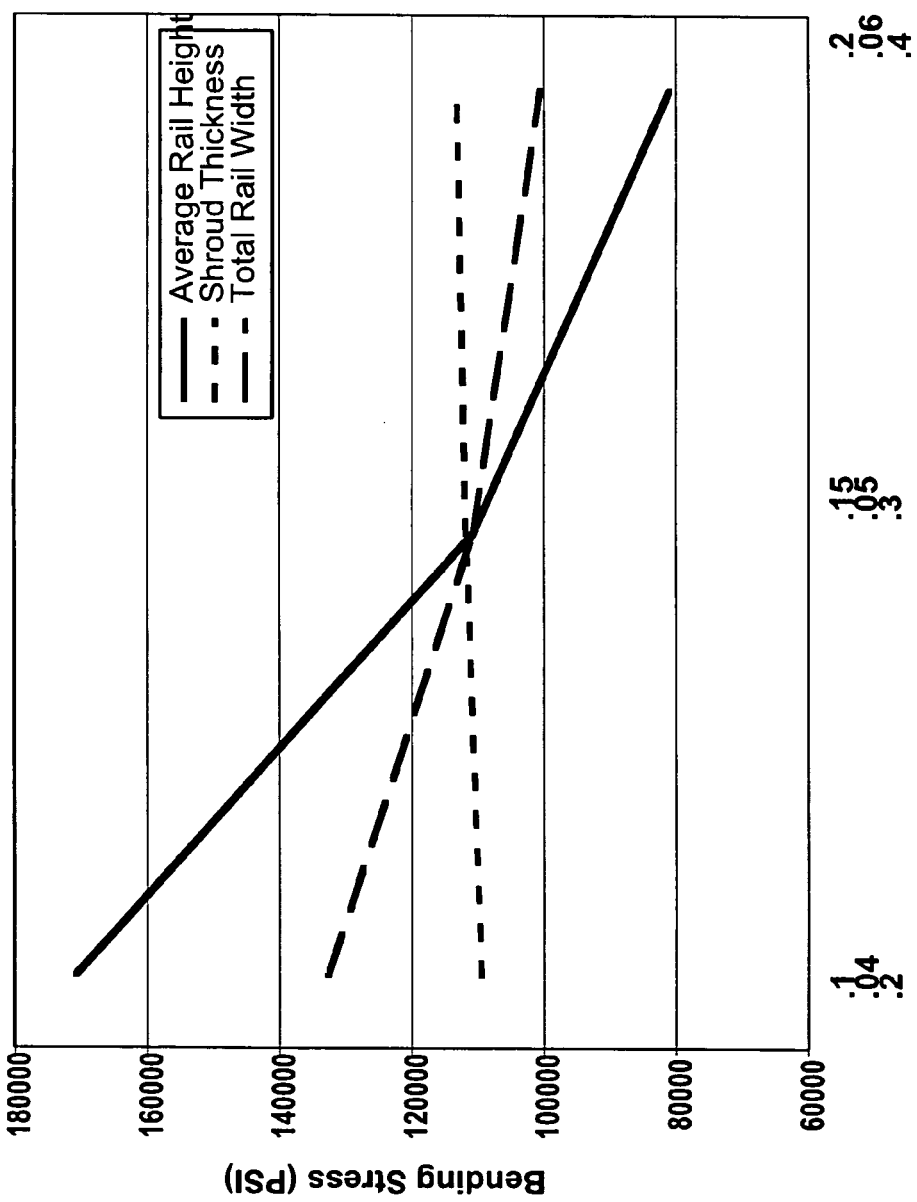
Figure 6:
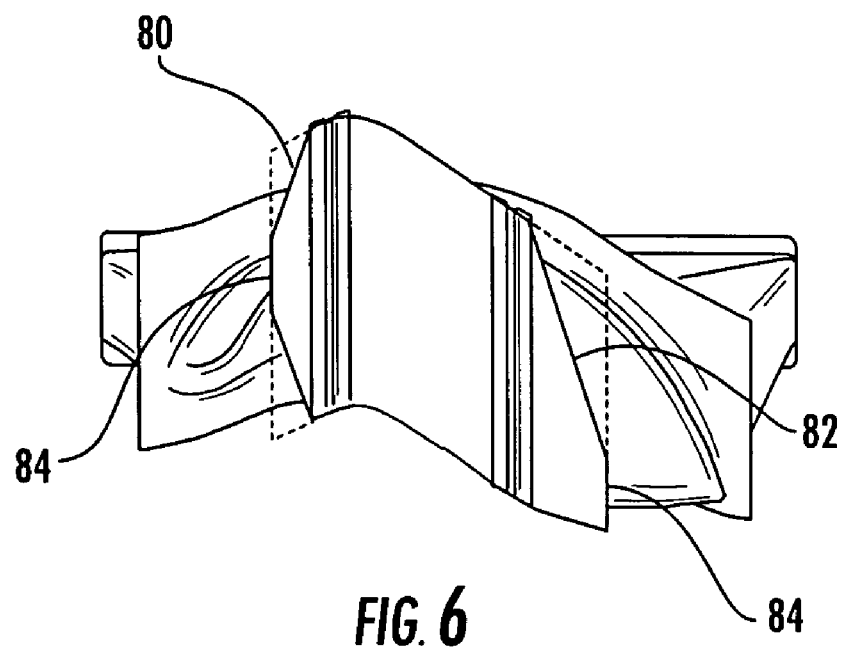
Figure 7:
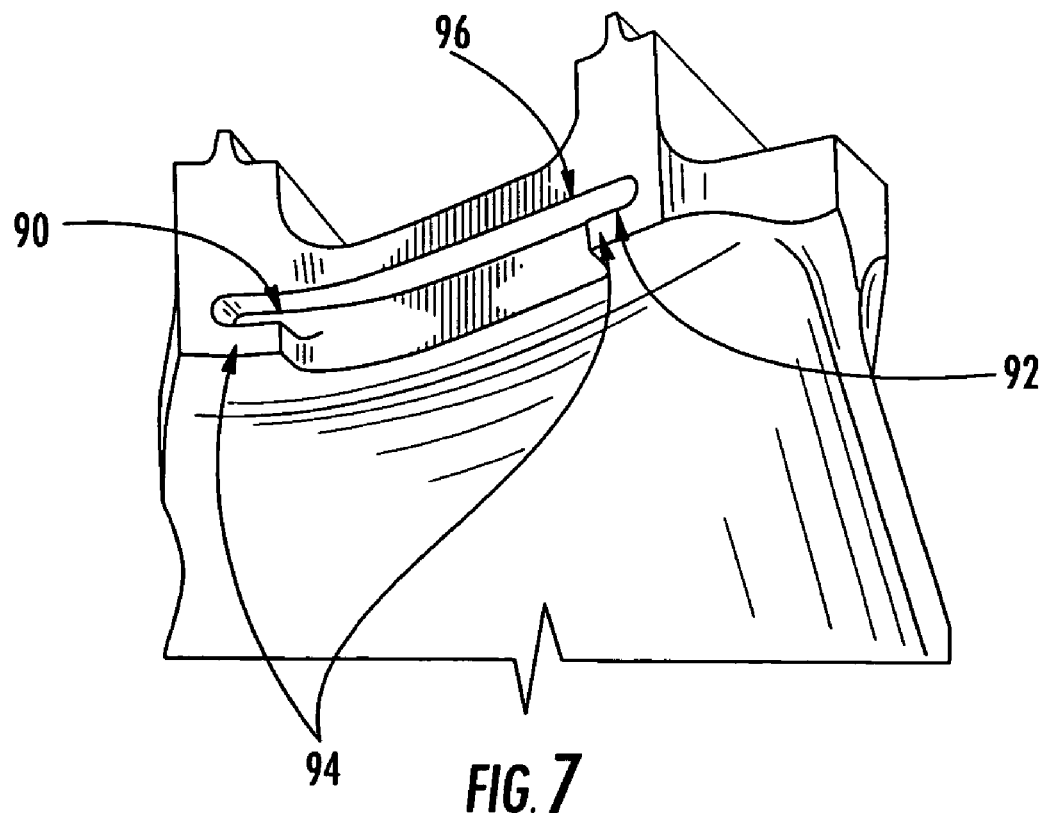

Having thus described the invention in general terms, reference will now be made to the accompanying drawings, which are not necessarily drawn to scale, and wherein:

FIG. 1 shows a perspective view of a prior art rotor assembly;

FIG. 2 shows a perspective view of a rotor blade incorporating a prior art shroud;

FIG. 3 shows a top elevation view of rotor blades incorporating a prior art shroud;

FIG. 4 shows a side elevation view of a rotor blade incorporating a shroud according to one embodiment of the present invention;

FIG. 5 shows graphical results of experimental simulations of several embodiments of the present invention;

FIG. 6 shows a perspective view of a rotor blade incorporating a shroud according to another embodiment of the present invention in which the leading and trailing edges are tapered; and FIG. 7 shows a side elevation view of a rotor blade incorporating a shroud according to another embodiment of the present invention in which the damper cavity inner diameter surface defines an opening having a narrow ledge.

DETAILED DESCRIPTION OF THE INVENTION

The present invention now will be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 4 illustrates a rotor blade incorporating a shroud of one embodiment of the present invention. The airfoil portion of the rotor blade includes a generally concave high-pressure sidewall 52 and a generally convex low-pressure sidewall 54 that extend axially from the blade leading edge 56 to the blade trailing edge 58. The shroud has a lower portion 60 with a constant thickness, T, defined by the distance between its upper surface and opposing lower surface, between the shroud leading 62 and trailing 64 edges and between the shroud first 66 and second 68 circumferential sides. Lower portion 60 has a slight curvature to match the curvature of the stationary housing and has a reduced thickness relative to conventional shrouds. In one nonlimiting embodiment, the shroud thickness T is approximately 0.045 inches, although shroud thickness will vary depending upon various design and operating conditions. The reduced, constant shroud thickness results in a significant mass reduction compared with conventional shroud designs in which shroud thickness increases near the fillet 40. This reduction in mass significantly reduces the centrifugal stress on the blade produced by the shroud during operation.

However, the reduced shroud thickness increases centrifugal bending stress on the shroud. Therefore, the shroud of one advantageous embodiment includes one or more reinforcing flanges 70, with a defined height H and width W. The reinforcing flanges are generally integral with the remainder of the shroud and extend continuously across the top surface of the shroud lower portion between first and second circumferential sides. If only one reinforcing flange is used, it is preferably placed on the shroud lower portion in the axial location of the greatest shroud overhang in the circumferential direction. If more than one reinforcing flange is used, they are preferably placed in close proximity to the leading and trailing edges or where the shroud overhang in the circumferential direction is generally greater. Multiple reinforcing flanges are preferably of equal height H and width W. The reinforcing flanges are depicted in FIG. 4 with a rectangular cross section but may have any suitable cross-section. Optionally, the reinforcing flange may be tapered in the axial, circumferential or radial direction, or combinations thereof, thereby further reducing the shroud mass, although such a construction may reduce rotor efficiency by allowing leakage of working fluid.

The reinforcing flanges add additional mass, but generally only a fraction of the mass removed by the use of a reduced thickness shroud. The combination of mass reduction from a constant thickness shroud and strength addition from the reinforcing flanges results in reduction of centrifugal stresses on the blade and the shroud during operation of the rotor assembly.

The reinforcing flange may optionally include a sealing rail 72 extending generally radially outward from the reinforcing flange and continuously across the top surface of the reinforcing flange between the shroud first and second circumferential sides. The sealing rail advantageously defines radial and axial dimensions, as known in the art, to reduce leakage of working fluid between the sealing rail and the stationary housing. The sealing rail may be constructed of the same material as the blade or any other suitable material.

A series of experimental simulations were conducted to assess the affect on the shroud centrifugal bending stress of variations in shroud thickness T, reinforcing flange height H and reinforcing flange width W. The simulations were done on a rotor assembly rotating at 30,000 revolutions per minute in a 1000° F. environment. The rotor assembly blades were constructed of Thermospan®. The blades included shrouds with two reinforcing flanges although the present invention contemplates any number of reinforcing flanges. The results of the experimental simulations are illustrated graphically in FIG. 5, where reported reinforcing flange widths are the total reinforcing flange width (e.g., the two reinforcing flanges would have individual widths of one-half the reported width).

In the first simulation, the shroud thickness T was reduced from 0.06 to 0.04 inches in 0.01-inch increments while reinforcing flange height and width were held constant at 0.15 and 0.3 inches, respectively. As can be seen in FIG. 5, the reduction in shroud thickness had no appreciable affect on shroud centrifugal bending stress. Next, reinforcing flange width was varied between 0.2 and 0.4 inches in 0.1-inch increments while maintaining reinforcing flange height constant at 0.15 inches and shroud thickness constant at 0.45 inches. The additional strength provided by a wider reinforcing flange more than offset the effect of the additional mass, resulting in a reduction in shroud centrifugal bending stress from approximately 132 ksi at a width of 0.2 inches, to approximately 110 ksi at a width of 0.3 inches, to approximately 100 ksi at a width of 0.4 inches.

The most dramatic effect on shroud centrifugal bending stress resulted from variations in reinforcing flange height. While maintaining reinforcing flange width constant at 0.3 inches and shroud thickness constant at 0.045 inches, reinforcing flange height was increased in 0.05-inch increments from 0.1 inches to 0.2 inches. The additional strength provided by a taller reinforcing flange significantly reduced shroud bending stress from over 170 ksi at a height of 0.1 inches to approximately 110 ksi at a height of 0.15 inches, down to approximately 80 ksi at a height of 0.2 inches.

As can be seen from the graphical results in FIG. 5, significant reductions in centrifugal bending stress on the shroud are achieved when the reinforcing flange height H is more than three times the shroud thickness T. To a much smaller extent, advantageous reductions in centrifugal bending stress are also realized when the sum of the widths W of all reinforcing flange(s) is at least twice the height H of the reinforcing flange(s).

FIG. 6 shows the shroud of another embodiment of the present invention in which the shroud leading 80 and trailing 82 edges are tapered in a circumferential direction. Various tapering configurations may be used. The taper illustrated in FIG. 6 for both the leading and trailing edge has a maximum where the shroud intersects 84 the airfoil portion of the blade and decreases generally linearly approaching the shroud first and second circumferential sides. This tapering further reduces the shroud mass compared to conventional shroud designs, which have generally parallel leading and trailing edges and an axial dimension or width that is equal to the widest portion of a tapered shroud, as shown by the dashed lines in FIG. 6. In order to prevent working fluid leakage, at least a portion of the circumferential edges preferably remain contoured to complement at least a portion of the circumferentially adjacent shrouds (not shown). The reduced shroud mass further reduces the centrifugal bending stress on the shroud during operation while continuing to minimize leakage of working fluid.

FIG. 7 illustrates a shroud of yet another embodiment of the present invention that includes an opening in the shroud circumferential sides called a damper cavity 90. A frictional damper is placed within the enclosure formed by the damper cavities of two adjacent shrouds. This enclosure retains the damper during operation while allowing relative motion between the damper and the adjacent shrouds. If the damper is not retained within the damper cavity during operation, it will be carried away by the flow of the working fluid and damage downstream components. When the rotor assembly rotates, centrifugal forces urge the damper into frictional contact with radially distal surfaces of the two adjacent shrouds. This frictional rubbing contact reduces the relative motion between the adjacent blades, thereby reducing the vibratory stresses on the blades during operation. When the rotor assembly is not rotating, either the inner diameter surface of the damper cavity or the outer diameter of the damper cavity retains the damper against the force of gravity, depending upon the relative location of the blade on the rotor assembly upon stopping.

Inclusion of a damper cavity may necessitate increasing the thickness of the shroud near the circumferential sides to accommodate the damper cavity. In one nonlimiting embodiment, the shroud thickness T is increased to approximately 0.08 inches from each circumferential side inward towards the shroud axial centerline approximately 0.07 inches.

In the embodiment of the present invention illustrated in FIG. 7, the damper cavity 90 defines an opening through an inner diameter surface 92 having at least two opposed ledges 94 that extend axially inward from the damper cavity sidewall. The outer diameter surface 96 of the shroud damper cavity still retains the damper against centrifugal forces during operation of the rotor assembly. However, during non-operation, the ledges may, if necessary, retain the damper against the force of gravity. The ledges extend axially inward a distance sufficient to support the damper, typically 0.075 inches. This configuration effectively retains a blade-to-blade damper during rotation and non-rotation, and eliminates the additional mass of a shroud damper cavity with completely intact surfaces. The reduction in shroud mass further reduces the centrifugal bending stress on the shroud during operation.

Although the various embodiments above are described separately, each may be combined with other disclosed embodiments. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A blade of a rotor assembly, said blade comprising:
   a root portion;
   an airfoil portion extending radially from said root portion;
   a shroud extending radially from said airfoil portion, said shroud having a lower portion with a thickness in a radial direction and including at least one reinforcing flange extending radially from said lower portion defining a reinforcing flange height and extending axially along said lower portion defining a reinforcing flange width;
   wherein said reinforcing flange height is at least three times greater than the minimum thickness of said shroud lower portion.

2. The blade of claim 1, wherein said reinforcing flange includes a sealing rail extending radially therefrom.

3. The blade of claim 1, wherein said shroud includes at least two reinforcing flanges wherein the sum of all reinforcing flange widths is at least two times greater than the average height of the reinforcing flanges.

4. The blade of claim 1, wherein said lower portion extends axially between opposed leading and trailing edges and extends circumferentially between opposed first and second circumferential sides; and wherein said leading edge and trailing edges are tapered in a circumferential direction.

5. The blade of claim 4, wherein said shroud defines a constant thickness between said opposed leading and trailing edges and said opposed first and second circumferential sides.

6. The blade of claim 1, wherein said shroud defines a damper cavity having an inner diameter surface and an outer diameter surface.

7. A blade of a rotor assembly, said blade comprising:
   a root portion;
   an airfoil portion extending radially from said root portion;
   a shroud extending radially from said airfoil portion, said shroud having a lower portion with a thickness in a radial direction and including at least one reinforcing flange extending radially from said lower portion defining a reinforcing flange height and extending axially along said lower portion defining a reinforcing flange width, said reinforcing flange height being at least three times greater than the minimum thickness of said shroud lower portion;
   wherein said shroud defines a damper cavity having an inner diameter surface and an outer diameter surface, and said damper cavity inner diameter surface defines an opening therethrough, said opening having at least two opposed ledges.

8. A blade of a rotor assembly, said blade comprising:
   a root portion;
   an airfoil portion extending radially from said root portion;
   a shroud extending radially from said airfoil portion, said shroud having a lower portion with a constant thickness in a radial direction and including at least one reinforcing flange extending radially from said lower portion defining a reinforcing flange height and extending axially along said lower portion defining a reinforcing flange width, said reinforcing flange having a radially distal surface that is substantially parallel to said shroud lower portion; and
   a sealing rail extending radially from said radially distal surface of said reinforcing flange.

9. The blade of claim 8, wherein said reinforcing flange height is at least three times greater than the thickness of said shroud.

10. The blade of claim 8, wherein said shroud includes at least two reinforcing flanges wherein the sum of all reinforcing flange widths is at least two times greater than the average height of the reinforcing flanges.

11. The blade of claim 8, wherein said lower portion extends axially between opposed leading and trailing edges and extends circumferentially between opposed first and second circumferential sides; and wherein said leading edge and trailing edges are tapered in a circumferential direction.

12. The blade of claim 8, wherein said shroud defines a damper cavity having an inner diameter surface and an outer diameter surface.

13. A blade of a rotor assembly, said blade comprising:
    a root portion;
    an airfoil portion extending radially from said root portion;
    a shroud extending radially from said airfoil portion, said shroud having a lower portion with a substantially constant thickness in a radial direction and including at least one reinforcing flange extending radially from said lower portion defining a reinforcing flange height and extending axially along said lower portion defining a reinforcing flange width;
    wherein said shroud defines a damper cavity having an inner diameter surface and an outer diameter surface, and said damper cavity inner diameter surface defines an opening therethrough, said opening having at least two opposed ledges.

14. A blade of a rotor assembly, said blade comprising:
    a root portion;
    an airfoil portion extending radially from said root portion;
    a shroud extending radially from said airfoil portion, said shroud having a lower portion with a thickness in a radial direction and wherein said lower portion extends axially between opposed leading and trailing edges and extends circumferentially between opposed first and second circumferential sides; said leading and trailing edges being tapered in a circumferential direction;
    wherein said shroud defines a damper cavity with an inner diameter surface and an outer diameter surface wherein said damper cavity inner diameter surface defines an opening therethrough, said opening having at least two opposed ledges.

15. The blade of claim 14, wherein said shroud includes at least one reinforcing flange extending radially from said lower portion defining a reinforcing flange height and extending axially along said lower portion defining a reinforcing flange width; and wherein said reinforcing flange height is at least three times greater than the minimum thickness of said shroud lower portion.

16. The blade of claim 15, wherein said shroud includes at least two reinforcing flanges wherein the sum of all reinforcing flange widths is at least two times greater than the average height of the reinforcing flanges.

17. The blade of claim 14, wherein said shroud defines a constant thickness between said opposed leading and trailing edges and said opposed first and second circumferential sides.

18. A blade of a rotor assembly, said blade comprising:
   a root portion;
   an airfoil portion extending radially from said root portion; and
   a shroud extending radially from said airfoil portion, said shroud having a lower portion with a thickness in a radial direction, said shroud defining a damper cavity with an inner diameter surface and an outer diameter surface wherein said damper cavity inner diameter surface defines an opening therethrough, said opening having at least two opposed ledges.

19. The blade of claim 18, wherein said shroud includes at least one reinforcing flange extending radially from said lower portion defining a reinforcing flange height and extending axially along said lower portion defining a reinforcing flange width; and wherein said reinforcing flange height is at least three times greater than the minimum thickness of said shroud lower portion.

20. The blade of claim 19, wherein said shroud includes at least two reinforcing flanges wherein the sum of all reinforcing flange widths is at least two times greater than the average height of the reinforcing flanges.

21. The blade of claim 18, wherein said shroud defines a constant thickness between said opposed leading and trailing edges and said opposed first and second circumferential sides.

22. The blade of claim 18, wherein said lower portion extends axially between opposed leading and trailing edges and extends circumferentially between opposed first and second circumferential sides; and wherein said leading edge and trailing edges are tapered in a circumferential direction.

* * * * *